United States Patent
Ooishi et al.

(10) Patent No.: US 9,172,087 B2
(45) Date of Patent: Oct. 27, 2015

(54) ELECTRODE MATERIAL, ELECTRODE AND LITHIUM ION BATTERY

(71) Applicant: SUMITOMO OSAKA CEMENT CO., LTD., Chiyoda-ku, Tokyo (JP)

(72) Inventors: Kenta Ooishi, Tokyo (JP); Koji Oono, Tokyo (JP); Takao Kitagawa, Toky (JP); Tetsuya Nakabeppu, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 0 days.

(21) Appl. No.: 14/202,346

(22) Filed: Mar. 10, 2014

(65) Prior Publication Data
US 2014/0272593 A1    Sep. 18, 2014

(30) Foreign Application Priority Data
Mar. 15, 2013 (JP) ................................. 2013-053758

(51) Int. Cl.
*H01M 4/587* (2010.01)
*H01M 4/36* (2006.01)
*H01M 4/62* (2006.01)
*H01M 4/02* (2006.01)

(52) U.S. Cl.
CPC .............. *H01M 4/366* (2013.01); *H01M 4/625* (2013.01); *H01M 2004/021* (2013.01)

(58) Field of Classification Search
CPC ... H01M 4/625; H01M 4/366; H01M 4/6825; H01M 4/136; H01M 4/0471; H01M 4/1397
USPC ................................................. 429/221, 232
See application file for complete search history.

(56) References Cited

U.S. PATENT DOCUMENTS

2004/0137328 A1    7/2004  Kim et al.
2004/0214087 A1    10/2004 Sheem et al.
(Continued)

FOREIGN PATENT DOCUMENTS

EP    2124272 A1    11/2009
EP    2339675       6/2011
(Continued)

OTHER PUBLICATIONS

Kim et al., "Enhancement of electrochemical performance of lithium iron phosphate by controlled sol—gel synthesis", Electrochimica Acta, vol. 53, Issue 28, Nov. 30, 2008, pp. 8258-8264, ISSN 0013-4686.*
(Continued)

*Primary Examiner* — Nicholas P D'Aniello
(74) *Attorney, Agent, or Firm* — Merchant & Gould P.C.

(57) ABSTRACT

An electrode material contains an agglomerate formed by agglomerating a plurality of agglomerated particles formed by agglomerating a plurality of particles of a carbonaceous coated electrode active material having a carbonaceous coat formed on a surface, the agglomerate is made up of hollow-structured particles and solid-structured particles, the average particle diameter of the agglomerate is in a range of 0.5 μm to 100 μm, the volume density of the agglomerate is in a range of 50% by volume to 80% by volume, the micropore distribution of micropores present in the agglomerate is monomodal, the average micropore diameter in the micropore distribution is 0.3 μm or less, and the NMP oil absorption amount of the agglomerate is in a range of 40 g/100 g to 100 g/100 g.

15 Claims, 1 Drawing Sheet

(56) References Cited

U.S. PATENT DOCUMENTS

| | | |
|---|---|---|
| 2005/0247914 A1 | 11/2005 | Mao et al. |
| 2006/0068287 A1 | 3/2006 | Morita et al. |
| 2007/0054187 A1 | 3/2007 | Nuspl et al. |
| 2009/0142668 A1 | 6/2009 | Ishii |
| 2009/0155689 A1* | 6/2009 | Zaghib et al. ............... 429/221 |
| 2010/0021820 A1 | 1/2010 | Ishii |
| 2010/0233540 A1 | 9/2010 | Choy et al. |
| 2010/0233545 A1 | 9/2010 | Sano et al. |
| 2010/0261063 A1 | 10/2010 | Kitagawa et al. |
| 2010/0279117 A1 | 11/2010 | Gu |
| 2011/0037019 A1 | 2/2011 | Nakano et al. |
| 2011/0195308 A1 | 8/2011 | Lee et al. |
| 2011/0262811 A1 | 10/2011 | Kinoshita et al. |
| 2012/0003540 A1 | 1/2012 | Nakano et al. |
| 2013/0302673 A1 | 11/2013 | Ravet et al. |

FOREIGN PATENT DOCUMENTS

| | | |
|---|---|---|
| EP | 2654110 | 10/2013 |
| JP | A-2000-058040 | 2/2000 |
| JP | A-2001-015111 | 1/2001 |
| JP | A-2002-110162 | 4/2002 |
| JP | A-2004-296367 | 10/2004 |
| JP | A-2005-123107 | 5/2005 |
| JP | A-2005-135925 | 5/2005 |
| JP | A-2005-158401 | 6/2005 |
| JP | A-2006-032241 | 2/2006 |
| JP | A-2007-511458 | 5/2007 |
| JP | A-2007-173134 | 7/2007 |
| JP | A-2007-250417 | 9/2007 |
| JP | A-2009-129587 | 6/2009 |
| JP | A-2009-152188 | 7/2009 |
| JP | A-2009-544563 | 12/2009 |
| JP | A-2010-157405 | 7/2010 |
| JP | A-2010-218884 | 9/2010 |
| JP | A-2010-232091 | 10/2010 |
| JP | A-2010-251302 | 11/2010 |
| JP | A-2011-076820 | 4/2011 |
| JP | A-2011-210649 | 10/2011 |
| JP | A-2012-104290 | 5/2012 |
| JP | A-2012-133888 | 7/2012 |
| JP | A-2012-524982 | 10/2012 |
| KR | 10-2010-0044727 | 4/2010 |
| WO | WO 00/60680 A1 | 10/2000 |
| WO | WO 2008-077447 A1 | 7/2008 |
| WO | WO 2008/081944 A1 | 7/2008 |
| WO | WO 2009/131095 A1 | 10/2009 |
| WO | WO 2010/124384 A1 | 11/2010 |
| WO | WO 2011-033707 A1 | 3/2011 |

OTHER PUBLICATIONS

Wang et al. "Preparation and characteristic of carbon-coated Li4Ti5012 anode material" *J. of Power Sources, Elsevier SA.* 174(2):1109-1112 (2007).
Comparative Table of claims 1 to 7 and Publications.
Comparative Table of claims 1 to 5 and Publications.
Comparative Table of claims 1 to 8 and Publications.
International Search Report for International Application No. PCT/JP2011/077394 mailed Feb. 28, 2012 (7 pages).
Notification (Information Statement) for JP Application No. 2010-282353 mailed Oct. 2, 2012 (7 pages).
Notification (Information Statement) for JP Application No. 2010-282353 mailed Nov. 25, 2014 (7 pages).
Decision of Rejection for JP Application No. 2010-282353 mailed Jan. 13, 2015 (7 pages).
Decision of Rejection for JP Application No. 2011-207833 mailed Jan. 23, 2015 (7 pages).
Office Action for U.S. Appl. No. 14/567,384 mailed Jan. 26, 2015 (26 pages).
Office Action for U.S. Appl. No. 13/993,403 mailed Jan. 27, 2015 (20 pages).
European Search Report for EP Application No. 11848684.4 mailed Mar. 23, 2015 (4 pages).
International Search Report for International Application No. PCT/JP2011/072589 mailed Oct. 9, 2012 (4 pages).
Notification (Information Statement) for JP Application No. 2011-207832 mailed Mar. 25, 2014 (5 pages).
Office Action for U.S. Appl. No. 14/345,520 mailed Feb. 20, 2015 (10 pages).
European Search Report for EP Application No. 12833286.3 mailed Mar. 3, 2015 (10 pages).
Decision of Rejection for JP Application No. 2011-207833 mailed Jan. 13, 2015 (7 pages).

* cited by examiner

ELECTRODE MATERIAL, ELECTRODE AND LITHIUM ION BATTERY

This application claims priority to Japanese Patent Application No. 2013-053758 filed 15 Mar. 2013, the disclosure of which is hereby incorporated by reference in its entirety.

BACKGROUND OF THE INVENTION

1. Field of the Invention

The present invention relates to an electrode material, an electrode and a lithium ion battery, and particularly to an electrode material that is preferably used as a positive electrode material used in batteries and, furthermore, a positive electrode material used in lithium ion batteries, an electrode containing the above-described electrode material, and a lithium ion battery including a positive electrode made of the above-described electrode.

2. Description of Related Art

In recent years, as a battery expected to attain a decrease in size and weight and an increase in capacitance, non-aqueous electrolytic solution secondary batteries such as lithium ion batteries have been proposed, and have been put into practical use.

The lithium ion battery is made up of a positive electrode and a negative electrode which can reversibly accept and expel lithium ions and a non-aqueous electrolyte.

Regarding negative electrode materials of lithium ion batteries, generally, a carbon-based material or a Li-containing metallic oxide which can reversibly accept and expel lithium ions, such as lithium titanate ($Li_4Ti_5O_{12}$), is used as a negative electrode active material.

On the other hand, regarding positive electrode materials of lithium ion batteries, a Li-containing metallic oxide which can reversibly accept and expel lithium ions, such as lithium iron phosphate ($LiFePO_4$) or an electrode material mixture containing a binder and the like is used as a positive electrode active material. In addition, a positive electrode of a lithium ion battery is formed by applying the electrode material mixture to a surface of a metal foil called a collector.

The lithium ion battery has a light weight, a small size and a high energy compared to secondary batteries of the related art, such as lead batteries, nickel-cadmium batteries and nickel-hydrogen batteries, and therefore the lithium ion battery is used not only as a small-scale power supply for portable electronic devices such as mobile phones and notebook computers but also as a large-scale stationary emergency power supply.

In addition, in recent years, studies are being conducted regarding the use of the lithium ion battery as a high-output power supply in plug-in hybrid vehicles, hybrid vehicles, electromotive tools and the like, and batteries being used as a high-output power supply in the above-described machines are required to have high-speed charge and discharge characteristics.

However, there is a problem in that an electrode active material of the related art, for example, an electrode material containing a lithium phosphate compound which can reversibly accept and expel lithium ions has low electron conductivity. Therefore, in order to increase the electron conductivity of electrode materials, an electrode material is proposed in which the surfaces of particles of an electrode active material are coated with an organic compound which serves as a carbon source, and then the organic compound is carbonized, whereby a carbonaceous coat is formed on the surface of the electrode active material, and carbon in the carbonaceous coat is interposed as an electron-conducting material (Patent Documents 1 and 2 and the like).

Meanwhile, as an electrode active material that realizes stable charge and discharge cycle characteristics, electrode active materials formed by joining the particles of a carbonaceous coated electrode active material having a carbonaceous coat formed on the surface together through an electron conductive substance such as carbon for which the N-methyl-2-pyrrolidone (NMP) oil absorption amount is controlled to be in a range of 25 g/100 g to 35 g/100 g (Patent Document 3) or for which the N-methyl-2-pyrrolidone (NMP) oil absorption amount is controlled in a range of 25 g/100 g to 200 g/100 g (Patent Document 4) have been proposed.

[Patent Document 1] Japanese Laid-open Patent Publication No. 2001-15111

[Patent Document 2] Japanese Laid-open Patent Publication No. 2012-133888

[Patent Document 3] Japanese Laid-open Patent Publication No. 2012-104290

[Patent Document 4] PCT Japanese Patent Domestic Republication No. 2011-033707

SUMMARY OF THE INVENTION

However, while the electrode active materials described in Patent Documents 1 and 2 and the like had characteristics of the internal resistance that could be decreased due to the presence of the uniform carbonaceous coat and the electrode density that could be improved due to the high density, and therefore the electrode active materials could realize a high battery capacitance, and were extremely useful for use in large-scale secondary batteries such as a power supply for power storage, for use in an in-vehicle power supply mounted in electric vehicles and the like in which the electrode active materials were required to immediately contribute to the power assist or regeneration of engines, the electrode active materials were required to have high-level input and output characteristics, and therefore there was a problem in that it was necessary to improve the input and output characteristics.

Meanwhile, since the electrode active material described in Patent Document 3 had a small NMP oil absorption amount, the number of voids was not enough to sufficiently obtain the input and output characteristics using the liquid retention property of an electrolytic solution, and there was a problem in that the electrode active material was required to have a larger NMP oil absorption amount to improve the input and output characteristics.

Furthermore, while it is certain that the electrode active material described in Patent Document 4 had a sufficiently large NMP oil absorption amount, the surface was not sufficiently coated with the carbonaceous coat, and therefore there was a problem in that the amount of the carried carbonaceous coat varied significantly.

The invention has been made to solve the above-described problems, and an object of the invention is to provide an electrode material that can improve the variation in the amount of the carried carbonaceous coat by increasing the NMP oil absorption amount while increasing the volume density of an agglomerate in a case in which the agglomerate formed by agglomerating an electrode active material having a carbonaceous coat formed on the surface is used as an electrode material, an electrode and a lithium ion battery.

As a result of intensive studies to solve the above-described problems, the present inventors and the like found that, when an agglomerate formed by agglomerating a plurality of agglomerated particles formed by agglomerating a plurality of the particles of a carbonaceous coated electrode active material having a carbonaceous coat formed on the surface is made up of hollow-structured particles and solid-structured particles, the average particle diameter of the agglomerate is set in a range of 0.5 μm to 100 μm, the volume density of the agglomerate is set in a range of 50% by volume to 80% by volume of the volume density of the solid agglomerate, the micropore distribution of micropores present in the agglomerate is set to be monomodal, the average micropore diameter in the micropore distribution is set to 0.3 μm or less, and, furthermore, the N-methyl-2-pyrrolidone (NMP) oil absorption amount of the agglomerate is set in a range of 40 g/100 g to 100 g/100 g, it is possible to increase the NMP oil absorption amount while increasing the volume density of the agglomerate, and consequently, it is possible to improve the deviation in the amount of the carried carbonaceous coat, and completed the invention.

That is, according to the invention, there is provided an electrode material containing an agglomerate formed by agglomerating a plurality of agglomerated particles formed by agglomerating a plurality of particles of a carbonaceous coated electrode active material having a carbonaceous coat formed on a surface, in which the agglomerate is made up of hollow-structured particles and solid-structured particles, an average particle diameter of the agglomerate is in a range of 0.5 μm to 100 μm, a volume density of the agglomerate is in a range of 50% by volume to 80% by volume of the volume density of the solid agglomerate, a micropore distribution of micropores present in the agglomerate is monomodal, an average micropore diameter in the micropore distribution is 0.3 μm or less, and an N-methyl-2-pyrollidone oil absorption amount of the agglomerate is in a range of 40 g/100 g to 100 g/100 g.

Diameters of voids formed in the agglomerate are preferably in a range of 0.1 μm to 10 μm.

The ratio of the film thickness of a carbonaceous coat in an inner circumferential portion to the film thickness of the carbonaceous coat in an outer circumferential portion of an outer shell of the agglomerate is preferably in a range of 0.7 to 2.0.

An electrode of the invention contains the electrode material of the invention.

A lithium ion battery of the invention includes a positive electrode made of the electrode of the invention.

According to the electrode material of the invention, since an agglomerate formed by agglomerating a plurality of agglomerated particles formed by agglomerating a plurality of the particles of a carbonaceous coated electrode active material having a carbonaceous coat formed on the surface is made up of hollow-structured particles and solid-structured particles, the average particle diameter of the agglomerate is set in a range of 0.5 μm to 100 μm, the volume density of the agglomerate is set in a range of 50% by volume to 80% by volume of the volume density of the solid agglomerate, the micropore distribution of micropores present in the agglomerate is set to be monomodal, the average micropore diameter in the micropore distribution is set to 0.3 μm or less, and, furthermore, the N-methyl-2-pyrrolidone (NMP) oil absorption amount of the agglomerate is set in a range of 40 g/100 g to 100 g/100 g, it is possible to increase the NMP oil absorption amount while increasing the volume density of the agglomerate, and it is possible to extremely decrease the variation in the amount of the carried carbonaceous coat.

According to the electrode of the invention, since the electrode contains the electrode material of the invention, it is possible to extremely decrease the deviation in the amount of the carried carbonaceous coat, and therefore it is possible to suppress the internal resistance of the electrode at a low level.

In addition, since the NMP oil absorption amount of the agglomerate is set in a range of 40 g/100 g to 100 g/100 g, it is possible to improve the liquid retention property of an electrolytic solution in the agglomerate. As a result, it is possible to significantly improve the electron conductivity and to significantly improve the input and output characteristics.

According to the lithium ion battery of the invention, since the lithium ion battery includes a positive electrode made of the electrode of the invention, it is possible to suppress the internal resistance of the electrode at a low level and to significantly improve the electron conductivity, and therefore it is possible to significantly improve the input and output characteristics.

As a result, it is possible to significantly improve the input and output characteristics even in a case in which the lithium ion battery is mounted in electric vehicles and the like in which the electrode active material is required to immediately contribute to the power assist or regeneration of engines.

DETAILED DESCRIPTION OF THE INVENTION

Figure 1:
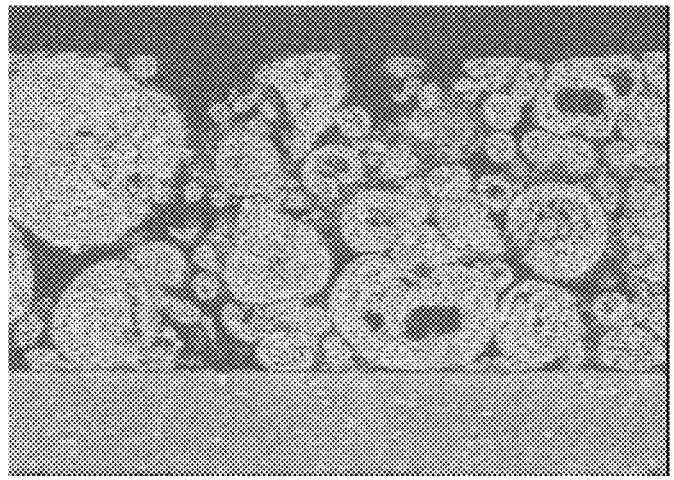
FIG. 1 is a scanning electron microscopic (SEM) image illustrating a cross-section of a positive electrode of a lithium ion battery of Example 1 of the invention.

An embodiment for carrying out the electrode material, electrode and lithium ion battery of the invention will be described.

Meanwhile, the present embodiment is a specific description for better understanding of the purpose of the invention, and, unless particularly otherwise described, the embodiment does not limit the invention.

[Electrode Material]

An electrode material of the embodiment contains an agglomerate formed by agglomerating a plurality of agglomerated particles formed by agglomerating a plurality of the particles of a carbonaceous coated electrode active material having a carbonaceous coat formed on a surface, in which the agglomerate is made up of hollow-structured particles and solid-structured particles, the average particle diameter of the agglomerate is in a range of 0.5 μm to 100 μm, the volume density of the agglomerate is in a range of 50% by volume to 80% by volume of the volume density of the solid agglomerate, the micropore distribution of micropores present in the agglomerate is monomodal, the average micropore diameter in the micropore distribution is 0.3 μm or less, and the N-methyl-2-pyrrolidone (NMP) oil absorption amount of the agglomerate is in a range of 40 g/100 g to 100 g/100 g.

Here, the agglomerate formed by agglomerating a plurality of agglomerated particles formed by agglomerating a plurality of the particles of a carbonaceous coated electrode active material refers to an agglomerate that is a single structure produced by agglomerating the particles of a carbonaceous coated electrode active material together in a point-contact state, thereby forming a neck-like shape with a small cross-sectional area at the contact portions between electrode active material particles of the particles of a carbonaceous coated electrode active material so as to agglomerate the plurality of strongly-connected agglomerated particles.

In addition, the hollow-structured particles refer to particles which include one or two or more large voids in the agglomerate and are separated from the outer space of the agglomerate through an outer shell made of the electrode active material particles bonded together through the carbonaceous coat. The electrode active material particles are strongly bonded together through the carbonaceous coats forming a neck-like shape with a small cross-sectional area, and channel-like (net-like) micropores spread three-dimensionally inside the outer shell of the agglomerate. In addition, the voids in the agglomerate and the outer space of the agglomerate are coupled through the three-dimensionally spreading channel-like (net-like) micropores.

On the other hand, the solid-structured particles refer to particles having no void in a state of densely filling the inside of the agglomerate, and the density of the solid-structured particles is considered to be equal to the theoretical density of the electrode active material.

When a part of the agglomerate is made up of the hollow-structured particles as described above, it is possible to decrease the deviation in the amount of the carried carbonaceous coat that covers the surfaces of the electrode active material particles. Therefore, when producing an electrode paste using the agglomerate, it becomes possible to make the outer shell of the agglomerate bear the volume density of the agglomerate which is necessary to prevent the collapse of the agglomerate and to provide a sufficient NMP oil absorption amount.

The electrode active material that configures the agglomerate preferably contains one element selected from a group of $Li_xA_yD_zPO_4$ (here, A represents one or two or more selected from a group consisting of Co, Mn, Ni, Fe, Cu and Cr; D represents one or two or more selected from a group consisting of Mg, Ca, S, Sr, Ba, Ti, Zn, B, Al, Ga, In, Si, Ge, Sc, Y and rare earth elements, $0<x<2$, $0<y<1.5$, and $0 \leq z<1.5$) as a principal component.

Here, A is preferably Co, Mn, Ni or Fe, and D is preferably Mg, Ca, Sr, Ba, Ti, Zn or Al in terms of a high discharge potential, a rich resource amount, safety and the like.

Here, the rare earth element refers to 15 elements which are La, Ce, Pr, Nd, Pm, Sm, Eu, Gd, Tb, Dy, Ho, Er, Tm, Yb and Lu which belongs to the lanthanum series.

The diameters of the voids formed in the agglomerate are preferably in a range of 0.1 μm to 10 μm, are more preferably in a range of 0.4 μm to 8 μm, and are still more preferably in a range of 1 μm to 6 μm.

Here, when the diameters of the voids formed in the agglomerate are smaller than 0.1 μm, the N-methyl-2-pyrolidone (NMP) oil absorption amount of the agglomerate becomes less than 40 g/100 g, which is not preferable. On the other hand, when the diameters of the voids formed in the agglomerate exceed 10 μm, it becomes impossible to maintain the shell shape of the agglomerate such that the concentration of the vapor of an organic compound in the voids becomes too low, and consequently, the film thickness of the carbonaceous coat in the inner circumferential portion of the outer shell of the agglomerate becomes thin, and the internal resistance of the electrode active material particles becomes high, which is not preferable.

The number of the voids formed in the agglomerate may be one or two or more.

The diameters of the voids formed in the agglomerate can be obtained by measuring the diameters of voids among the hollow-structured particles in 50 arbitrary agglomerated particles using a scanning electron microscope (SEM) and averaging the measured values. In actual cases, an operation in which the maximum length L and the minimum length W of a void among the hollow-structured particles are measured, and the average value of both lengths is computed as the diameter of a hollow-structured particle is carried out on each of 50 arbitrary agglomerated particles, and the sum of the average values is divided by the number of the hollow-structured particles, thereby computing the diameters of the voids.

In addition, in a case in which a plurality of voids is present among the hollow-structured particles, the volume of each void is computed from the value of the diameter measured with an assumption that the respective voids are spherical voids, and the diameter of all voids computed from the sum of the volumes of the voids is considered to be the diameter of the voids among the hollow-structured particles.

The diameters of the voids among the hollow-structured particles are preferably in a range of 0.1 μm to 10 μm, and more preferably in a range of 0.4 μm to 8 μm.

The average particle diameter of the agglomerate is preferably in a range of 0.5 μm to 100 μm, is more preferably in a range of 1 μm to 50 μm, and is still more preferably in a range of 5 μm to 30 μm.

Here, the reason for limiting the average particle diameter of the agglomerate in the above-described range is that, when the average particle diameter is less than 0.5 μm, the agglomerate is too fine and thus becomes easily flyable, and, when producing electrode paste using the agglomerate, it becomes difficult to handle the agglomerate; on the other hand, when the average particle diameter exceeds 100 μm, when producing a battery electrode using the agglomerate, it is highly likely that the agglomerate larger than the film thickness of the dried electrode is present, and therefore it becomes impossible to hold the uniformity of the film thickness of the electrode.

In the particles of a carbonaceous coated electrode active material that configures the agglomerate, 80% or more, and preferably 90% or more of the surfaces of the electrode active material particles are preferably coated with the carbonaceous coat to uniformly cause a reaction relating to the insertion and removal of lithium ions throughout the entire surfaces of the electrode active material particles when using the electrode material of the embodiment as an electrode material used in lithium ion batteries.

The coating ratio of the carbonaceous coat in the particles of the carbonaceous coated electrode active material can be measured using a transmission electron microscope (TEM) and an energy dispersive X-ray spectroscope (EDX). Here, at a coating ratio of the carbonaceous coat of less than 80%, the coating effect of the carbonaceous coat becomes insufficient, when the insertion and removal reaction of lithium ions is caused on the surface of the electrode active material, the resistance to the reaction relating to the insertion and removal of lithium ions becomes high at places in which the carbonaceous coat is not formed, and the voltage drop in the final phase of discharging becomes significant, which is not preferable.

The volume density of the agglomerate can be measured using a mercury porosimeter, and is computed from the mass of the entire electrode material made of the agglomerate and the volume of gaps among particles that configure the agglomerate.

The volume density of the agglomerate is preferably in a range of 50% by volume to 80% by volume, more preferably in a range of 55% by volume to 75% by volume, and still more preferably in a range of 60% by volume to 75% by volume of the volume density of the solid agglomerate.

Here, when the volume density of the agglomerate is less than 50% by volume, the concentration of the vapor of an aromatic carbon compound in the voids in the agglomerate becomes too low, the film thickness of the carbonaceous coat in the inner circumferential portion of the outer shell of the agglomerate becomes thin, and the internal resistance of the electrode active material becomes high, which is not preferable. On the other hand, when the volume density of the agglomerate exceeds 80% by volume, the density in the agglomerate becomes too high such that the channel-like (net-like) micropores inside the outer shell of the agglomerate become small, and consequently, a tar-like substance generated during the carbonization of the organic compound is confined in the agglomerate, which is not preferable.

Here, the "internal resistance" refers to places in the electrode active material particles having the surfaces on which the carbonaceous coat is not formed or the thickness of the carbonaceous coat is thin in which the resistance to the reaction relating to the insertion and removal of lithium ions is high, and, specifically, appears in a form of the degree of the voltage drop in the final phase of discharging when using the electrode material of the embodiment as an electrode active material for lithium ion batteries. That is, in the electrode active material particles in which the insertion and removal reaction of lithium ions is uniformly caused throughout the entire surfaces, the voltage drop in the final phase of discharging is small, and, on the other hand, in the electrode active material particles in which the resistance to the insertion and removal reaction of lithium ions is high at some of the surfaces of the electrode active material particles, the voltage drop in the final phase of discharging becomes significant.

When the volume density of the agglomerate is set in a range of 50% by volume to 80% by volume as described above, the agglomerate is made to be dense in a state of including a certain amount of micropores (voids) so that the strength of the entire agglomerate increases, for example, when the electrode active material is mixed with a binder, a conduction promoter and a solvent, thereby preparing an electrode slurry, the agglomerate does not easily break, and consequently, an increase in the viscosity of the electrode slurry is suppressed, and the fluidity is maintained, whereby the coatability becomes favorable, and it is possible to improve the filling ability of the electrode active material in a coat of the electrode slurry.

In addition, when the volume density of the agglomerate is 50% by volume or more, the outer shell of the agglomerate becomes dense so that the strength of the agglomerate increases, the agglomerate is prevented from being easily smashed due to pressurization when forming a positive electrode layer, voids are held in the positive electrode layer, the liquid retention property of the electrolytic solution can be improved, and secondary batteries having excellent input and output characteristics can be obtained.

In addition, for example, when the agglomerate is mixed with a binding agent, a conduction promoter and a solvent, thereby preparing electrode paste, the agglomerate does not easily break, and consequently, an increase in the viscosity of the electrode paste is suppressed, and the fluidity is maintained, whereby the coatability becomes favorable, and it is also possible to improve the filling ability of the electrode active material in a coat of the electrode paste. Meanwhile, in a case in which the agglomerate is broken when producing the electrode paste, since the necessary amount of the binding agent that binds the electrode active materials together is increased, the electrode adhesion is decreased due to an increase in the viscosity of the electrode paste, a decrease in the concentration of the solid content in the electrode paste, and the lack of the binding agent that binds the agglomerates together in the electrode layer, which is not preferable. Meanwhile, in a case in which the agglomerate is broken when producing the electrode slurry, since the necessary amount of the binder that binds the electrode active material particles together is increased, an increase in the viscosity of the electrode slurry, a decrease in the concentration of the solid content in the electrode slurry, and a decrease in the ratio of the electrode active material to the total mass of an electrode film are caused, which is not preferable.

The micropore distribution of the micropores present in the agglomerate can be measured using a mercury porosimeter. The micropore distribution is preferably monomodal.

Here, the reason for the micropore distribution being preferably monomodal is that, when the micropore distribution becomes monomodal, that is, a normal distribution, the amount of coarse voids in the agglomerate decreases, and the volume density of the agglomerate becomes uniform, whereby the amount of a carbon compound derived from an organic compound vaporizing from the inside of the agglomerate, particularly, an aromatic carbon compound becomes uniform, and therefore the deviation in the amount of the carried carbonaceous coat carried on the surface of the electrode active material in the agglomerate becomes small.

The micropore diameter (D50) in the micropore distribution at which the cumulative volume percentage from the small micropore diameter side becomes 50%, that is, the average micropore diameter is preferably 0.3 µm or less, and more preferably in a range of 0.1 µm to 0.25 µm.

Here, the reason for the average micropore diameter of the micropores being preferably 0.3 µm or less is that, when the average micropore diameter exceeds 0.3 the volume density of the agglomerate becomes, relatively, less than 50% by volume, and therefore, when producing an electrode slurry using the agglomerate, a binding agent and a solvent, the binding agent can easily intrude into the agglomerate, and consequently, the amount of the binding agent that connects the agglomerates together decreases, and the strength of an electrode film formed using the electrode slurry decreases.

Furthermore, in the micropore distribution, the micropore diameter (D90) at which the cumulative volume percentage from the small micropore diameter side becomes 90% is preferably 1.0 µm or less, and is more preferably 0.5 µm or less.

Here, the reason for the micropore diameter (D90) being preferably 1.0 µm or less is that, when the micropore diameter (D90) in the micropore distribution exceeds 1.0 µm, since the micropore distribution excessively widens in the diameter direction, it becomes impossible to maintain the monomodal micropore distribution, at the same time, an increase in the micropore diameter (D90) of the agglomerate forms coarse voids in the agglomerate, an increase in the amount of the coarse voids makes the volume density of the agglomerate uneven, and consequently, the amount of the carbon compound, such as aromatic hydrocarbon, vaporizing from the inside of the agglomerate becomes uneven, and therefore the deviation in the amount of the carried carbonaceous coat carried on the surface of the electrode active material in the agglomerate becomes large.

The N-methyl-2-pyrrolidone (NMP) oil absorption amount of the agglomerate is preferably in a range of 40 g/100 g to 100 g/100 g, and more preferably in a range of 45 g/100 g to 65 g/100 g.

Here, the reason for setting the NMP oil absorption amount of the positive electrode material in the above-described range is that, when the NMP oil absorption amount is less than 40 g/100 g, in a case in which an electrode layer is formed using the agglomerate, the electrode layer cannot sufficiently hold an electrolytic solution, and desired input and output characteristics (described below) cannot be obtained, which is not preferable.

On the other hand, when the NMP oil absorption amount exceeds 100 g/100 g, the proportion of the agglomerate in the hollow structure included in the electrode material becomes too great such that the tap density decreases, and consequently, it is necessary to increase the film thickness of the electrode paste to obtain a desired density of the electrode layer, and there is a concern that it may become impossible to uniformly coat the electrode layer, which is not preferable. Additionally, NMP which is a solvent of the electrode paste is excessively absorbed in the electrode layer, and therefore the viscosity of the electrode paste increases, and it becomes difficult to make the thickness of the electrode layer uniform, which is not preferable.

The ratio of the average film thickness of the carbonaceous coat in the inner circumferential portion to the average film thickness of the carbonaceous coat in the outer circumferential portion of the outer shell of the agglomerate (the thickness of the carbonaceous coat in the inner circumferential portion/the thickness of the carbonaceous coat in the outer circumferential portion) is preferably in a range of 0.7 to 2.0.

Here, when the ratio of the average film thickness of the carbonaceous coat in the inner circumferential portion to the average film thickness of the carbonaceous coat in the outer circumferential portion of the outer shell of the agglomerate (the thickness of the carbonaceous coat in the inner circumferential portion/the thickness of the carbonaceous coat in the outer circumferential portion) is outside the above-described range, the thickness of the carbonaceous coat in the outer circumferential portion or the inner circumferential portion of the outer shell of the agglomerate becomes thin, the deviation in the electron conductivity with which the electric resistance of the carbonaceous coat becomes high at a specific location in the agglomerate is caused, and the internal resistance of the agglomerate becomes high, which is not preferable.

Regarding the ratio of the average film thickness of the carbonaceous coat in the inner circumferential portion to the average film thickness of the carbonaceous coat in the outer circumferential portion of the outer shell of the agglomerate (the thickness of the carbonaceous coat in the inner circumferential portion/the thickness of the carbonaceous coat in the outer circumferential portion), "the thickness of the carbonaceous coat in the inner circumferential portion/the thickness of the carbonaceous coat in the outer circumferential portion" can be computed by observing the carbonaceous coat in the agglomerate using a transmission electron microscope (TEM), measuring the average value of the thicknesses of the carbonaceous coats in 100 different particles in the central portion, that is, the inner circumferential portion of the agglomerate and the average value of the thicknesses of the carbonaceous coats in 100 different particles in the outer circumferential portion, and using the above-described measured values.

In a case in which the electrode material is evaluated, a 2032 coin-type cell having an electrode film thickness of 60 μm is used, and a method in which the internal resistance of the electrode material is measured using the current-resist method. The internal resistance obtained in the above manner is preferably 20Ω or less.

Here, the reason for limiting the internal resistance to 20Ω or less is that, when the internal resistance exceeds 20Ω, it becomes necessary to reduce the internal resistance as a battery by decreasing the electrode film thickness such that the battery capacitance per electrode decreases, and consequently, it becomes necessary to increase the number of electrodes to realize a desired capacitance in the battery.

When the number of electrodes is increased, the number of electrode members such as a collector and a separator having no battery activity increases in accordance with the number of electrodes, and thus the battery capacitance decreases, which is not preferable.

[Method of Manufacturing Electrode Materials]

In a method of manufacturing electrode materials of the embodiment, an electrode active material or a precursor thereof, an organic compound and a solvent are mixed so as to produce a slurry, then, the slurry is sprayed and dried, and the obtained dried substance is fired at a temperature in a range of 500° C. to 1000° C. in a non-oxidizing atmosphere, thereby obtaining an electrode material in which the average particle diameter of the agglomerate made up of the hollow-structured particles and the solid-structured particles is in a range of 0.5 μm to 100 μm, the volume density of the agglomerate is in a range of 50% by volume to 80% by volume of the volume density of the solid agglomerate, the micropore distribution of micropores present in the agglomerate is monomodal, the average micropore diameter in the micropore distribution is 0.3 μm or less, and the NMP oil absorption amount is in a range of 40 g/100 g to 100 g/100 g.

Hereinafter, the above-described method of manufacturing electrode materials will be described in detail.

Similarly to what has been described regarding the electrode material, the electrode active material preferably contains one selected from a group of $Li_xA_yD_zPO_4$ (here, A represents one or two or more selected from a group consisting of Co, Mn, Ni, Fe, Cu and Cr; D represents one or two or more selected from a group consisting of Mg, Ca, S, Sr, Ba, Ti, Zn, B, Al, Ga, In, Si, Ge, Sc, Y and rare earth elements, $0<x<2$, $0<y<1.5$, and $0 \le z<1.5$) as a principal component.

Here, A is preferably Co, Mn, Ni or Fe, and D is preferably Mg, Ca, Sr, Ba, Ti, Zn or Al in terms of a high discharge potential, a rich resource amount, safety and the like.

Here, the rare earth element refers to 15 elements which are La, Ce, Pr, Nd, Pm, Sm, Eu, Gd, Tb, Dy, Ho, Er, Tm, Yb and Lu which belong to the lanthanum series.

As the compound ($Li_xA_yD_zPO_4$ powder) represented by $Li_xA_yD_zPO_4$, it is possible to use a compound manufactured by using a method of the related art such as a solid phase method, a liquid phase method or a gas phase method.

As the compound ($Li_xA_yD_zPO_4$ powder), it is possible to preferably use a compound ($Li_xA_yD_zPO_4$ powder) obtained by, for example, hydrothermally synthesizing a lithium salt such as lithium acetate ($LiCH_3COO$) or lithium chloride (LiCl) or a slurry-form mixture obtained by mixing a Li source selected from a group consisting of lithium hydroxide (LiOH), a divalent iron salt such as iron (II) chloride ($FeCl_2$), iron (II) acetate (Fe ($CH_3COO)_2$) or iron (II) sulfate ($FeSO_4$), a phosphate compound such as phosphoric acid ($H_3PO_4$), ammonium dihydrogen phosphate ($NH_4H_2PO_4$) or diammonium hydrogen phosphate (($NH_4)_2HPO_4$), and water using a pressure-resistant closed container; washing the obtained settlement using water so as to generate a cake-form precursor substance, and firing the cake-form precursor substance.

The $Li_xA_yD_zPO_4$ powder may be crystalline particles, amorphous particles, or mixed crystal particles containing both crystalline particles and amorphous particles. Here, the reason why the $Li_xA_yD_zPO_4$ powder may be amorphous particles is that, when thermally treated at a temperature in a range of 500° C. to 1000° C. in a non-oxidizing atmosphere, the $Li_xA_yD_zPO_4$ powder crystallizes.

The size of the electrode active material particle is not particularly limited, but the average particle diameter of primary particles is preferably in a range of 0.01 μm to 20 μm, and is more preferably in a range of 0.02 μm to 5 μm.

Here, the reason for limiting the average particle diameter of the primary particles of the electrode active material in the above-described range is that, when the average particle diameter of the primary particles is less than 0.01 µm, it becomes difficult to sufficiently coat the surfaces of the primary particles with a carbon thin film, the discharge capacitance becomes low at a high-speed charge and discharge rate, and it becomes difficult to realize a sufficient charge and discharge rate performance, which is not preferable, and, on the other hand, when the average particle diameter of the primary particles exceeds 20 µm, the internal resistance of the primary particles becomes high, and therefore the discharge capacitance becomes insufficient at a high-speed charge and discharge rate, which is not preferable.

The shape of the electrode active material is not particularly limited. The shape of the electrode active material is frequently characterized depending on the manufacturing method, and, for example, it is likely that spherical particles are obtained in a solid phase method and rectangular particles or rod-like particles are obtained in a hydrothermal synthesis method. Here, since spherical particles have an excellent filling ability, rectangular particles have excellent reactivity for the insertion and removal of lithium ions, and the rod-like particles easily come into contact with each other so as to have characteristics of excellent conductivity and the like, the spherical particles, the rectangular particles and the rod-like particles may be solely used, or a mixture of two or more kinds of the particles may be used.

In addition, examples of the organic compound include vinyls such as polyvinyl alcohol, polyvinyl pyrrolidone and polyvinyl acetate; celluloses such as cellulose, carboxymethyl cellulose, methyl cellulose, hydroxylethyl cellulose and hydroxylethyl cellulose; sugars such as glucose, fructose, galactose, mannose, maltose, sucrose and lactose; divalent alcohols such as starch, gelatin, polyacrylic acid, polystyrene sulfonate, polyacrylamide, glycogen, pectin, alginic acid, glucomannan, chitin, hyaluronic acid, chondroitin, agarose, polyethers and ethylene glycol; trivalent alcohols such as glycerin; and the like.

The mixing ratio of the organic compound to the electrode active material is, when the total amount of the organic compound is converted to the amount of carbon, preferably in a range of 0.6 parts by mass to 10 parts by mass, and more preferably in a range of 0.8 parts by mass to 2.5 parts by mass with respect to 100 parts by mass of the electrode active material.

Here, when the mixing ratio of the organic compound in terms of the amount of carbon is less than 0.6 parts by mass, the coating ratio of the carbonaceous coat becomes less than 80%, and, in a case in which a battery has been formed using a slurry containing the electrode active material and the organic compound, the discharge capacitance decreased at a high-speed charge and discharge rate, and it becomes difficult to realize a sufficient charge and discharge rate performance, which is not preferable. On the other hand, when the mixing ratio of the organic compound in terms of the amount of carbon exceeds 10 parts by mass, the mixing ratio of the electrode active material decreases, in a case in which a battery has been formed using a slurry containing the electrode active material and the organic compound, the capacitance of the battery decreases, and the bulk of the electrode active material becomes great due to the excessive carrying of the carbonaceous coat, and therefore the electrode density decreases, and it becomes impossible to ignore a decrease in the battery capacitance per unit volume of the lithium ion battery, which is not preferable.

The electrode active material or a precursor thereof and the organic compound are dissolved or dispersed in a solvent, thereby preparing a homogeneous slurry. When dissolving or dispersing the electrode active material or a precursor thereof and the organic compound, a dispersant may be added as necessary.

The solvent is most optimally water in terms of ease of procurement, ease of handling, and a decrease in the manufacturing cost. In addition, it is also possible to use a liquid mixture obtained by mixing water and a solvent having a different boiling point from that of water.

Here, as the solvent having a different boiling point from that of water, for example, a solvent selected from a group of monovalent alcohols such as methanol (boiling point: 64.1° C. at 1 atmosphere), ethanol (boiling point: 78.3° C. at 1 atmosphere) and 2-propanol (boiling point: 82.4° C. at 1 atmosphere); divalent alcohols such as ethylene glycol (boiling point: 197° C. at 1 atmosphere); trivalent alcohols such as glycerin (boiling point: 290° C. at 1 atmosphere), sugar alcohols, phenols, cycloparaffin-based hydrocarbon (cycloalkane), cycloolefin-based hydrocarbon (cycloalkene), cycloacetylene-based hydrocarbon (cycloalkyne), benzene-based aromatic compounds, condensed ring aromatic compounds, benzo-condensed ring compounds, benzo-condensed ring compounds, heteroaromatic compounds and non-benzene-based aromatic compounds may be solely used, or a mixture of two or more solvents may be used.

A method for dissolving or dispersing the electrode active material and the organic compound in the solvent is not particularly limited as long as the electrode active material is dispersed and the organic compound is dissolved or dispersed, and, for example, a medium stirring-type dispersing apparatus that stirs medium particles at a high rate such as a planetary ball mill, a vibrational ball mill, a beads mill, a paint shaker or an attritor is preferably used.

When dissolving or dispersing the electrode active material and the organic compound, it is preferable to disperse the electrode active material in a form of primary particles, then, add the organic compound, and stir the components so as to be dissolved. Then, the surfaces of the primary particles of the electrode active material are coated with the organic compound, and consequently, carbon derived from the organic compound is uniformly interposed between the primary particles of the electrode active material.

When adjusting the slurry, it is necessary to appropriately adjust the dispersion conditions of the slurry, for example, the concentration of the electrode active material or the precursor thereof in the slurry, the concentration of the organic compound, the stirring rate, the stirring time and the like so that the ratio (D90/D10) of the particle diameter (D90) at a cumulative volume percentage of 90% in the particle size distribution of the electrode active material or the precursor thereof in the slurry to the particle diameter (D10) at a cumulative volume percentage of 10% in the same particle size distribution becomes in a range of 5 to 30. Then, the particle size distribution of the electrode active material or the precursor thereof in the slurry becomes wide, and therefore the electrode active material in the agglomerate obtained by spraying and drying the slurry is closely packed, and it is possible to realize the volume density of the agglomerate in a range of 50% by volume to 80% by volume.

Next, the slurry is generally sprayed and dried in a high-temperature atmosphere having an atmosphere temperature that is equal to or higher than the boiling point of the solvent, for example, in the atmosphere having a temperature in a range of 70° C. to 250° C.

Here, when the conditions of the spraying, for example, the concentration of the electrode active material or the precursor thereof in the slurry, the concentration of the organic compound, the spraying pressure and the rate, and, furthermore, the conditions of the drying after the spraying, for example, the temperature-rise rate, the maximum holding temperature, the holding time, and the like are appropriately adjusted, a dried substance having an average particle diameter in a range of 0.5 μm to 100 μm, and preferably in a range of 0.5 μm to 20 μm can be obtained.

Since the atmosphere temperature during the spraying and drying affect the evaporation rate of the solvent in the slurry, it is possible to control the structure of the obtained dried substance using the atmosphere temperature.

For example, as the atmosphere temperature approximates to the boiling point of the solvent in the slurry, it takes a longer time to dry the sprayed liquid droplets, and therefore the obtained dried substance is sufficiently condensed during the necessary time for drying. Then, it is difficult for the dried substance sprayed and dried at an atmosphere temperature near the boiling point of the solvent in the slurry to have a hollow structure.

Meanwhile, when the slurry is sprayed and dried at an atmosphere temperature that is much higher than the boiling point of the solvent in the slurry, since the sprayed liquid droplets are immediately dried, the fluidity of the slurry significantly decreases. Therefore, the obtained dried substance is immediately dried, and thus cannot obtain a sufficient time necessary to be condensed. Then, it becomes easy for the dried substance sprayed and dried at an atmosphere temperature higher than the boiling point of the solvent in the slurry to have a hollow structure. Furthermore, it is possible to make the micropore distribution of the micropores present in the agglomerate monomodal, and to set the average micropore diameter of the agglomerate to 0.3 μm or less.

Here, for example, in a case in which only water is used as the solvent in the slurry, since the boiling point of water is 100° C., the atmosphere temperature is preferably set in a range of 200° C. to 250° C. to obtain a dried substance having a hollow structure.

The drying time can also be controlled using solvents having a different boiling point as well as the atmosphere temperature. In this case, all the solvents in the slurry may be changed to other solvents, and some of the solvents in the slurry may be changed to solvents having a different boiling point.

As described above, when the atmosphere temperature is adjusted, and solvents having a different boiling point are jointly used, it is possible to make the micropore distribution of the micropores present in the agglomerate monomodal, to set the average micropore diameter of the agglomerate to 0.3 μm or less, and to adjust the proportion of the agglomerate having a hollow structure.

Next, the dried substance is fired in a non-oxidizing atmosphere at a temperature in a range of 500° C. to 1000° C., and preferably in a range of 600° C. to 900° C. for 0.1 hours to 40 hours.

The non-oxidizing atmosphere is preferably an inert atmosphere such as nitrogen ($N_2$) or argon (Ar), and, in a case in which it is necessary to further suppress oxidation, a reducing atmosphere containing approximately several percents by volume of a reducing gas such as hydrogen ($H_2$) is preferable. In addition, for the purpose of removing organic components evaporated in the non-oxidizing atmosphere during the firing, a combustion-supporting or flammable gas such as oxygen ($O_2$) may be introduced into the inert atmosphere.

Here, the reason for setting the firing temperature in a range of 500° C. to 1000° C. is that, when the firing temperature is lower than 500° C., since the decomposition and reaction of the organic compound included in the dried substance does not sufficiently progress, the organic compound is not sufficiently carbonized, and consequently, highly resistant decomposed substances of the organic compound are generated in the obtained agglomerate, which is not preferable, and, on the other hand, when the firing temperature exceeds 1000° C., Li in the electrode active material is evaporated such that not only is the composition of the electrode active material deviated, but grain growth is also promoted in the electrode active material, and consequently, the discharge capacitance at a high-speed charge and discharge rate becomes low, and it becomes difficult to realize a sufficient charge and discharge rate performance, which is not preferable.

Then, the surfaces of the primary particles of the electrode active material are coated with carbon generated due to the thermal decomposition of the organic compound in the dried substance, and therefore an agglomerate made of secondary particles having carbon interposed between the primary particles of the electrode active material is obtained.

The agglomerate becomes the electrode material of the embodiment.

[Electrode]

An electrode of the embodiment contains the electrode material of the embodiment.

In order to produce the electrode of the embodiment, the above-described electrode material, a binding agent made of a binder resin, and a solvent are mixed, thereby preparing paint for forming electrodes or paste for forming electrodes. At this time, a conduction promoter such as carbon black may be added as necessary.

Examples of the binding agent, that is, the binder resin that can be preferably used include polytetrafluoroethylene (PTFE) resins, polyvinylidene fluoride (PVdF) resins and fluorine-containing rubber.

The blending ratio of the binder resin to the electrode material is not particularly limited; however, for example, 1 part by mass to 30 parts by mass, preferably, 3 parts by mass to 20 parts by mass of the binder resin is blended with 100 parts by mass of the electrode material.

Examples of the solvent being used in the paint for forming electrodes or the paste for forming electrodes include water; alcohols such as methanol, ethanol, 1-propanol, 2-propanol (isopropyl alcohol: IPA), butanol, pentanol, hexanol, octanol and diacetone alcohol; esters such as ethyl acetate, butyl acetate, ethyl lactate, propylene glycol monomethyl ether acetate, propylene glycol monoethyl ether acetate and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether and diethylene glycol monoethyl ether; ketones such as acetone, methyl ethyl ketone (MEK), methyl isobutyl ketone (MIBK), acetyl acetone and cyclohexanone; amides such as dimethyl formamide, N,N-dimethyl acetoacetamide and N-methylpyrrolidone; and glycols such as ethylene glycol, diethylene glycol and propylene glycol. The solvent may be solely used, or a mixture of two or more solvents may be used.

The method for adjusting the paint for forming electrodes or the paste for forming electrodes is not particularly limited as long as the method can uniformly mix the electrode material, the binder resin, the conduction promoter, and the like, and, for example, a method in which a rotation and revolution-type kneader or the like is used is preferable.

Next, the paint for forming electrodes or the paste for forming electrodes is applied to a surface of a metal foil, and then dried, thereby obtaining a metal foil having a coat made of a mixture of the electrode material and the binder resin formed on a surface.

Next, the coat is pressurized and dried, thereby producing an electrode including an electrode material layer on a surface of the metal foil.

Then, it is possible to produce the electrode of the embodiment.

[Lithium Ion Battery]

A lithium ion battery of the embodiment includes a positive electrode made of the electrode of the embodiment.

For the lithium ion battery, when an electrode is produced using the electrode material of the embodiment, it is possible to decrease the internal resistance of the electrode, and to improve the input and output characteristics. Therefore, it is possible to provide an electrode having a small internal resistance and excellent input and output characteristics as a positive electrode used in lithium ion batteries.

Here, the input and output characteristics of the lithium ion battery can be evaluated using the following test methods.

(1) Test Method A

The lithium ion battery was subjected to a charge and discharge process three times in which the lithium ion battery was charged up to 4.2 V with a charging current of 0.2 C at 20° C. in the atmosphere, and then discharged up to 2.5 V at a discharging current of 0.2 C, and then, under different conditions from what has been described, that is, the lithium ion battery was charged up to 4.2 V at a charging current of 5 C and then discharged up to 2.5 V at a discharging current of 0.2 C.

(2) Test Method B

The lithium ion battery was subjected to a charge and discharge process three times in which the lithium ion battery was charged up to 4.2 V with a charging current of 0.2 C at 20° C. in the atmosphere, and then discharged up to 2.5 V at a discharging current of 0.2 C, and then, under different conditions from what has been described, that is, the lithium ion battery was charged up to 4.2 V at a charging current of 0.2 C and then discharged up to 2.5 V at a discharging current of 5 C.

The input and output characteristics indicate the characteristics of the lithium ion battery during high-speed charging and discharging, and, here, the input characteristic refers to the proportion of the capacitance when the lithium ion battery was charged up to 4.2 V with a charging current of 5 C (5 C charging (C5)) in the capacitance when the lithium ion battery was charged up to 4.2 V with a charging current of 0.2 C (0.2 C charging (C0.2)), which was carried out in Test method A, and is expressed as "C5/C0.2".

In addition, the output characteristic refers to the proportion of the capacitance when the lithium ion battery was discharged up to 2.5 V at a discharging current of 5 C (5 C discharging (D5)) in the capacitance when the lithium ion battery was discharged up to 2.5 V at a discharging current of 0.2 C (0.2 C discharging (D0.2)), which was carried out in Test method B, and is expressed as "D5/D0.2".

Regarding the input and output characteristics of the lithium ion battery, as the respective values of the input characteristic "C5/C0.2" and the output characteristic "D5/D0.2" increase, the high-speed charge and discharge characteristics can be determined to be favorable. Generally, each of the input characteristic "C5/C0.2" and the output characteristic "D5/D0.2" is preferably 85% or more from the viewpoint of an increase in the energy of the lithium ion battery.

As described above, according to the electrode material of the embodiment, since an agglomerate formed by agglomerating a plurality of agglomerated particles formed by agglomerating a plurality of the particles of a carbonaceous coated electrode active material having a carbonaceous coat formed on the surface is given, the average particle diameter of the agglomerate set in a range of 0.5 μm to 100 μm, the volume density of the agglomerate set in a range of 50% by volume to 80% by volume of the volume density of the solid agglomerate, the micropore distribution of micropores present in the agglomerate is set to be monomodal, the average micropore diameter in the micropore distribution is set to 0.3 μm or less, and, furthermore, the NMP oil absorption amount of the agglomerate set in a range of 40 g/100 g to 100 g/100 g, it is possible to increase the NMP oil absorption amount while increasing the volume density of the agglomerate. Therefore, it is possible to decrease the deviation in the amount of the carried carbonaceous coat formed on the surfaces of the electrode active material particles, and to decrease the variation in the electron conductivity of the electrode active material.

According to the electrode of the embodiment, since the electrode contains the electrode material of the embodiment, it is possible to extremely decrease the variation in the amount of the carried carbonaceous coat, and therefore it is possible to suppress the internal resistance of the electrode at a low level.

In addition, since the NMP oil absorption amount of the agglomerate is set in a range of 40 g/100 g to 100 g/100 g, it is possible to improve the liquid retention property of an electrolytic solution in the agglomerate. As a result, it is possible to significantly improve the electron conductivity and to significantly improve the input and output characteristics.

According to the lithium ion battery of the embodiment, since the lithium ion battery includes a positive electrode made of the electrode of the embodiment, it is possible to suppress the internal resistance of the electrode at a low level and to significantly improve the electron conductivity, and therefore it is possible to significantly improve the input and output characteristics.

As a result, it is possible to significantly improve the input and output characteristics even in a case in which the lithium ion battery is mounted in electric vehicles and the like in which the electrode active material is required to immediately contribute to the power assist or regeneration of engines.

EXAMPLES

Hereinafter, the invention will be specifically described using Examples 1 to 4 and Comparative Examples 1 to 4, but the invention is not limited to the examples.

For example, in the present example, artificial graphite was used for the negative electrode to reflect the behaviors of the electrode material in data, but other negative electrode materials such as a carbon material, silicon (Si), a silicon compound, Li, a Li alloy or $Li_4Ti_5O_{12}$ may be solely used, or a mixture thereof may be used. In addition, a solid electrolyte may be used instead of the electrolytic solution and the separator.

Example 1

(Production of an Electrode Material)

Lithium acetate ($LiCH_3COO$, 4 mol), iron (II) sulfate ($FeSO_4$, 2 mol) and phosphoric acid ($H_3PO_4$, 2 mol) were mixed with water (2 L) so that the total amount became 4 L, thereby preparing a homogeneous slurry-form mixture.

Next, the mixture was accommodated in a pressure-resistant closed container having a capacity of 8 L, and was hydrothermally synthesized at 120° C. for 1 hour.

Next, the obtained precipitate was washed using water, thereby obtaining a cake-form precursor of electrode active material.

Next, the precursor of the electrode active material (150 g in terms of the solid content), an aqueous solution of polyvinyl alcohol obtained by dissolving polyvinyl alcohol (PVA, 20 g) in water (200 g) as an organic compound, and zirconia balls having a diameter of 5 mm (500 g) as medium particles were injected into a ball mill, the stirring time of the ball mill was adjusted so that D90/D10 in the particle size distribution of the precursor particles of the electrode active material in the slurry became 7, and a dispersion treatment was carried out, thereby obtaining a precursor slurry.

Next, the obtained precursor slurry was sprayed and dried at 210° C. in the atmosphere, thereby obtaining a dried substance having an average particle diameter of 12 µm.

Next, the obtained dried substance was fired at 700° C. in a nitrogen atmosphere for 1 hour, thereby obtaining an agglomerate having an average particle diameter of 12 µm, which was used as an electrode material of Example 1.

(Evaluation of the Electrode Material)

The proportion of the hollow structure of the agglomerate in the electrode material, the shape of the micropore distribution, the average micropore diameter (D50), the volume density, the ratio of the average film thickness of the carbonaceous coat (the thickness of the carbonaceous coat in the inner circumferential portion/the thickness of the carbonaceous coat in the outer circumferential portion), the NMP oil absorption amount, and the diameters of voids were respectively evaluated.

The evaluation methods were as described below.

(1) The Proportion of the Hollow Structure

The agglomerate, an acryl resin binder, and N-methyl-2-pyrrolidone (NMP) as an organic solvent were mixed so as to produce paste, the paste was applied to a glass sheet, then, dried and cured, thereby producing a film which served as a specimen.

In order to obtain a cross-section of the obtained film, the film was polished using an abrasive, thereby exposing a cross-section of a plurality of the agglomerates.

Next, 50 agglomerates were arbitrarily selected from the plurality of the agglomerates, and the cross-sections of the agglomerates were observed using a scanning electron microscope (SEM), thereby evaluating the proportion of the hollow structure in the agglomerate (the number of hollow-structured agglomerates/the number of all agglomerates). As a result, 35 agglomerates had a substantially solid structure having no void, and 15 agglomerates had a hollow structure having voids therein. Therefore, the proportion of the hollow structure ("the number of hollow-structured agglomerates/the number of all agglomerates" in Table 1) was 15/50.

(2) The Shape of the Micropore Distribution and the Average Micropore Diameter (D50)

The shape of the micropore distribution and the average micropore diameter (D50) were measured using a mercury porosimeter.

As a result, it was confirmed that the shape of the micropore distribution was a normal distribution, and monomodal. In addition, the average micropore diameter (D50) was 0.19 µm.

(3) The Volume Density

The volume density of the agglomerate was measured using a mercury porosimeter.

As a result, the volume density of the agglomerate was 63% by volume.

(4) The Ratio of the Average Film Thickness of the Carbonaceous Coat

The carbonaceous coat in the agglomerate was observed using a transmission electron microscope (TEM), the thickness of the carbonaceous coat in the inner circumferential portion of the outer shell of the agglomerate and the thickness of the carbonaceous coat in the outer circumferential portion of the outer shell of the agglomerate were measured, and the ratio of the average film thickness of the carbonaceous coat (the thickness of the carbonaceous coat in the inner circumferential portion/the thickness of the carbonaceous coat in the outer circumferential portion) was computed.

As a result, the ratio of the average film thickness of the carbonaceous coat was 0.9.

(5) The NMP Oil Absorption Amount

The NMP oil absorption amount of the agglomerate was measured based on Japanese Industrial Standard JIS K 5101 "Pigment Testing Method".

As a result, the NMP oil absorption amount of the agglomerate was 56 g/100 g.

(6) The Diameters of Voids

A cross-section of an agglomerate film formed on a glass sheet was exposed and observed using a scanning electron microscope (SEM) in the same manner as in the above-described "(1) the proportion of the hollow structure", thereby measuring the average value of the diameters of voids among the hollow-structured particles in arbitrarily-selected 50 agglomerated particles.

Regarding the diameters of the voids, the maximum length L and the minimum length W of a void among the hollow-structured particles were measured, and the average value was used as the diameter of the hollow-structured particle. In addition, in a case in which a plurality of voids were present among the hollow-structured particles, the volume was computed from the diameter measured with an assumption that the respective voids were spherical voids, and the diameter of all voids computed from the sum of the volumes of the respective voids was used as the diameter of the voids among the hollow-structured particles.

As a result, the diameter of the void in the agglomerate was 3.5 µm.

The evaluation results are described in Table 1.

(Production of a Positive Electrode Used in Lithium Ion Batteries)

The above-described agglomerate as the electrode material, polyvinylidene fluoride (PVdF) as a binding agent, and acetylene black (AB) as a conduction promoter were mixed so that the mass ratio became 90:5:5, and, furthermore, N-methyl-2-pyrrolidinone (NMP) was added as a solvent so as to supply fluidity.

Next, the mixture was kneaded for 30 minutes at a revolution rate of 1200 rpm and a rotation rate of 800 rpm using a rotation and revolution-type kneader AWATORI RENTARO (product name, manufactured by Thinky Corporation), thereby producing paste for forming positive electrodes.

Next, the paste for forming positive electrodes was applied to a 15 µm-thick aluminum (Al) foil which was a collector, and dried. After that, the coat was pressurized using a pressure of 600 kgf/cm$^2$, thereby producing a positive electrode used in lithium ion batteries of Example 1.

(Evaluation of the Positive Electrode Used in Lithium Ion Batteries)

The positive electrode used in lithium ion batteries was evaluated. The evaluation methods were as described below.

(1) Adhesion of the Positive Electrode

The positive electrode used in lithium ion batteries was fixed to a metal sheet using double-sided tape, and the adhesion of the positive electrode was evaluated using a 90° peeling tester (manufactured by Tester Sangyo Co., Ltd.).

Here, positive electrodes which had sufficient adhesion to the Al foil (collector) and an electrode layer broken between layers were evaluated to be "O", and positive electrodes which had insufficient adhesion to the Al foil (collector) and an electrode layer peeled from the Al foil (collector) were evaluated to be "X".

The evaluation results are described in Table 2.

(2) The Presence of Voids in the Positive Electrode

The positive electrode used in lithium ion batteries was sealed using an acryl resin, polished using an abrasive so as to expose a cross-section, and the cross-section was observed using a scanning electron microscope (SEM), thereby evaluating the presence of voids in the positive electrode.

As a result, positive electrodes in which hollow-structured particle-derived voids were present without being smashed due to pressurization were evaluated to be "O", and positive electrodes in which voids were not present were evaluated to be "X".

A scanning electron microscopic (SEM) image of the cross-section of the positive electrode used in lithium ion batteries is illustrated in FIG. 1.

In addition, the evaluation results are described in Table 2.

(Production of a Lithium Ion Battery)

Artificial graphite powder as a negative electrode active material and polyvinylidene fluoride (PVdF) as a binding agent were mixed so that the mass ratio became 95:5, and, furthermore, N-methyl-2-pyrrolidinone (NMP) was added as a solvent so as to supply fluidity.

Next, the mixture was kneaded for 30 minutes at a revolution rate of 1200 rpm and a rotation rate of 800 rpm using a rotation and revolution-type kneader MAZERUSTAR (product name, manufactured by Kurabo industries Ltd.), thereby producing paste used to form negative electrodes.

Next, the paste used to form negative electrodes was applied to a 15 μm-thick aluminum (Al) foil which was a collector, and dried. After that, the aluminum foil was pressurized using a pressure of 600 kgf/cm$^2$, thereby producing a negative electrode used in lithium ion batteries of Example 1.

Next, the above-described negative electrode was disposed opposite to the positive electrode used in lithium ion batteries, and a separator made of porous polypropylene was disposed between the positive electrode and the negative electrode, thereby producing a battery member.

Meanwhile, ethylene carbonate and diethyl carbonate were mixed at 1:1 (mass ratio), and, furthermore, a LiPF$_6$ solution (1 M) was added, thereby producing an electrolyte solution having lithium ion conductivity.

Next, the above-described battery member was immersed in the electrolyte solution, and then a lamination treatment was carried out, thereby producing a lithium ion battery of Example 1.

(Evaluation of the Lithium Ion Battery)

Each of the charge and discharge characteristics, internal resistance, and input and output characteristics of the lithium ion battery was evaluated. The evaluation methods were as described below.

(1) Charge and Discharge Characteristics

A charge and discharge test of the lithium ion battery was carried out at room temperature (25° C.) at a cut-off voltage in a range of 2 V to 4.5 V with a constant current having a charge and discharge rate 1 C (one hour charging and then one hour discharging). The initial discharge capacitances are described in Table 2, and the discharge characteristics are illustrated in FIG. 2.

(2) Internal Resistance

Figure 2:
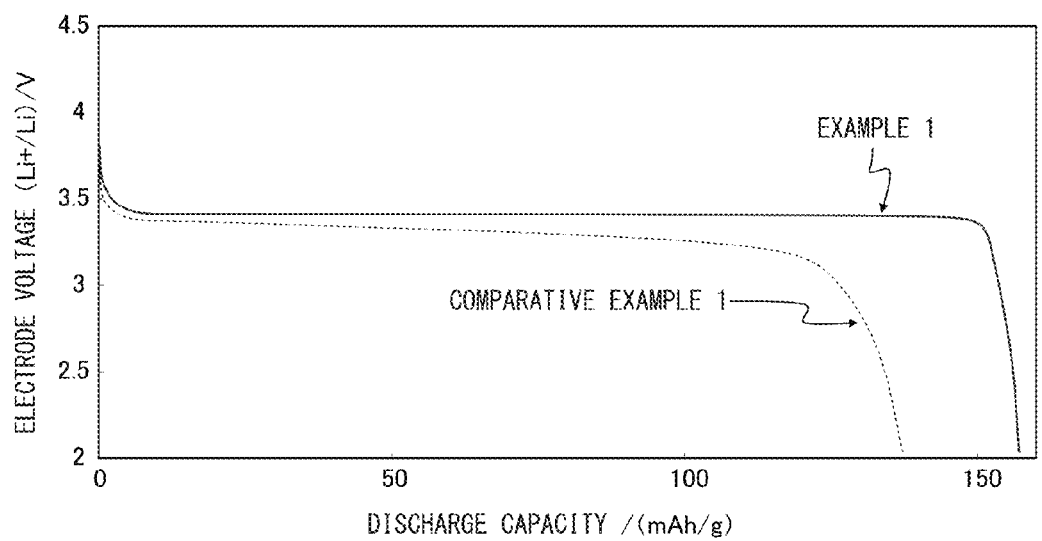
FIG. 2 is a view illustrating the discharging characteristics of lithium ion batteries of Example 1 and Comparative Example 1 of the invention respectively.

In the charge and discharge curve illustrated in FIG. 2, a voltage drop observed in the final phase of discharging illustrates the presence of the electrode active material not coated with the carbonaceous coat. Therefore, specimens in which a significant voltage drop was observed were determined as specimens having a high internal resistance. Here, specimens in which a voltage drop was not observed or was little were evaluated to be "O", and specimens in which a significant voltage drop was observed were evaluated to be "X".

(3) Input and Output Characteristics

The input and output characteristics were evaluated using the test method described in [Lithium ion battery].

Here, the input characteristic was evaluated at "C5/C0.2 (%)", and the output characteristic was evaluated at "D5/D0.2 (%)".

The evaluation results are described in Table 2.

Example 2

An electrode material, a positive electrode used in lithium ion batteries, and a lithium ion battery were produced in the same manner as in Example 1 except for the fact that the atmosphere temperature at which the precursor slurry was sprayed was set to 240° C., and evaluated.

The obtained agglomerate had an average particle diameter of 14 μm, and 24 out of 50 agglomerates were hollow-structured agglomerates having voids therein.

Meanwhile, in the lithium ion battery of Example 2 as well, the same voltage drop in the final phase of discharging as in Example 1 was observed.

The evaluation results are described in Tables 1 and 2.

Example 3

An electrode material, a positive electrode used in lithium ion batteries, and a lithium ion battery were produced in the same manner as in Example 1 except for the fact that the stirring time of the ball mill was adjusted so that D90/D10 in the particle size distribution of the precursor particles in the precursor slurry became 20, and evaluated.

The obtained agglomerate had an average particle diameter of 13 μm, and 18 out of 50 agglomerates were hollow-structured agglomerates having voids therein.

Meanwhile, in the lithium ion battery of Example 3 as well, the same voltage drop in the final phase of discharging as in Example 1 was observed.

The evaluation results are described in Tables 1 and 2.

Example 4

An electrode material, a positive electrode used in lithium ion batteries, and a lithium ion battery were produced in the same manner as in Example 1 except for the fact that a solvent mixture of water (60% by mass) and methanol (40% by mass) was used as the solvent in the precursor slurry, and evaluated.

The obtained agglomerate had an average particle diameter of 12 μm, and 23 out of 50 agglomerates were hollow-structured agglomerates having voids therein.

Meanwhile, in the lithium ion battery of Example 4 as well, the same voltage drop in the final phase of discharging as in Example 1 was observed.

The evaluation results are described in Tables 1 and 2.

Comparative Example 1

An electrode material, a positive electrode used in lithium ion batteries, and a lithium ion battery were produced in the same manner as in Example 1 except for the fact that the stirring time of the ball mill was adjusted so that D90/D10 in the particle size distribution of the precursor particles in the precursor slurry became 4, and evaluated.

The obtained agglomerate had an average particle diameter of 25 μm, and 31 out of 50 agglomerates were hollow-structured agglomerates having voids therein.

The evaluation results are described in Tables 1 and 2, and the charge characteristic is illustrated in FIG. 2.

Comparative Example 2

An electrode material, a positive electrode used in lithium ion batteries, and a lithium ion battery were produced in the same manner as in Example 1 except for the fact that the atmosphere temperature at which the precursor slurry was sprayed was set to 180° C., and evaluated.

The obtained agglomerate had an average particle diameter of 10 μm, and 7 out of 50 agglomerates were hollow-structured agglomerates having voids therein.

The evaluation results are described in Tables 1 and 2.

Comparative Example 3

An electrode material, a positive electrode used in lithium ion batteries, and a lithium ion battery were produced in the same manner as in Example 1 except for the fact that the atmosphere temperature at which the precursor slurry was sprayed was set to 130° C., and evaluated.

The obtained agglomerate had an average particle diameter of 7 μm, and all of 50 agglomerates were solid-structured agglomerates having no voids therein.

The evaluation results are described in Tables 1 and 2.

Since all of the obtained agglomerates were solid-structured agglomerates, for the agglomerates, the thickness of the carbonaceous coat in the inner circumferential portion and the thickness of the carbonaceous coat in the outer circumferential portion were measured, and the ratio of the average film thickness of the carbonaceous coat (the thickness of the carbonaceous coat in the inner circumferential portion/the thickness of the carbonaceous coat in the outer circumferential portion) was computed.

Comparative Example 4

An electrode material, a positive electrode used in lithium ion batteries, and a lithium ion battery were produced in the same manner as in Example 1 except for the fact that a solvent mixture of water (60% by mass) and methanol (40% by mass) was used as the solvent in the precursor slurry, and the atmosphere temperature at which the precursor slurry was sprayed was set to 130° C., and evaluated.

The obtained agglomerate had an average particle diameter of 10 and 12 out of 50 agglomerates were hollow-structured agglomerates having voids therein.

The evaluation results are described in Tables 1 and 2.

[Table 1]

|  | Number of hollow-structured agglomerates/ number of all agglomerates | Micropore distribution shape | Micropore distribution D50(μm) | Volume density (vol. %) | Ratio of average film thickness of carbonaceous coat | NMP oil absorption amount (g/100 g) | Diameters of voids |
|---|---|---|---|---|---|---|---|
| Example 1 | 15/50 | monomodal | 0.19 | 63 | 0.9 | 56 | 3.5 |
| Example 2 | 24/50 | monomodal | 0.22 | 58 | 1.2 | 64 | 5.5 |
| Example 3 | 18/50 | monomodal | 0.15 | 75 | 0.7 | 45 | 3.5 |
| Example 4 | 23/50 | monomodal | 0.21 | 60 | 0.9 | 78 | 4.5 |
| Comparative Example 1 | 31/50 | monomodal | 0.31 | 45 | 2.5 | 125 | 12 |
| Comparative Example 2 | 7/50 | monomodal | 0.18 | 65 | 0.9 | 38 | 0.8 |
| Comparative Example 3 | 0/50 | bimodal | 0.16 | 69 | 0.7 | 25 | — |
| Comparative Example 4 | 12/50 | bimodal | 0.34 | 58 | 2.0 | 47 | 1.3 |

[Table 2]

|  | Adhesion of positive electrode | Presence of voids in positive electrode | Initial discharge capacitance (mAh/g) | Internal resistance | Input characteristics (C5/C0.2(%)) | Output characteristics (D5/D0.2(%)) |
|---|---|---|---|---|---|---|
| Example 1 | ○ | ○ | 156 | ○ | 87 | 88 |
| Example 2 | ○ | ○ | 155 | ○ | 88 | 88 |
| Example 3 | ○ | ○ | 159 | ○ | 86 | 86 |
| Example 4 | ○ | ○ | 157 | ○ | 89 | 89 |
| Comparative Example 1 | x | ○ | 138 | x | 92 | 93 |
| Comparative Example 2 | ○ | ○ | 156 | ○ | 81 | 83 |
| Comparative Example 3 | ○ | — | 158 | ○ | 80 | 79 |
| Comparative Example 4 | x | ○ | 128 | ○ | 92 | 93 |

According to the above-described results, since the electrode materials of Examples 1 to 4 had a volume density of the agglomerate in a range of 50% by volume to 80% by volume and an NMP oil absorption amount in a range of 40 g/100 g to 100 g/100 g, it was found that the lithium ion batteries having excellent input and output characteristics, a low internal resistance, and excellent positive electrode adhesion could be obtained.

On the other hand, since the electrode material of Comparative Example 1 had a low volume density of the agglomerate of 45% by volume and a high NMP oil absorption amount of 125 g/100 g, the lithium ion battery had poor positive electrode adhesion.

The electrode material of Comparative Example 2 had a volume density of the agglomerate of 65% by volume but had a low NMP oil absorption amount of 38 g/100 g and the input and output characteristics of less than 85%, and therefore the lithium ion battery had poor high-speed charge and discharge characteristics.

The electrode material of Comparative Example 3 had a volume density of the agglomerate of 69% by volume but had a low NMP oil absorption amount of 25 g/100 g and the input and output characteristics of less than 80%, and therefore the lithium ion battery had poor high-speed charge and discharge characteristics.

The electrode material of Comparative Example 4 had a volume density of the agglomerate of 58% by volume and a NMP oil absorption amount of 47 g/100 g, but had a bimodal micropore distribution and a high average micropore diameter (D50) of 0.34 μm, and therefore the lithium ion battery had poor positive electrode adhesion.

Since the agglomerate formed by agglomerating a plurality of agglomerated particles formed by agglomerating a plurality of the particles of a carbonaceous coated electrode active material having a carbonaceous coat formed on the surface is made up of the hollow-structured particles and the solid-structured particles, the average particle diameter of the agglomerate is set in a range of 0.5 μm to 100 μm, the volume density of the agglomerate is set in a range of 50% by volume to 80% by volume of the volume density of the solid agglomerate, the micropore distribution of micropores present in the agglomerate is set to be monomodal, the average micropore diameter in the micropore distribution is set to 0.3 μm or less, and, furthermore, the N-methyl-2-pyrollidone (NMP) oil absorption amount of the agglomerate is set in a range of 40 g/100 g to 100 g/100 g, the electrode material of the invention can increase the NMP oil absorption amount while increasing the volume density of the agglomerate, can extremely decrease the variation in the amount of the carried carbonaceous coat, and can decrease the variation in the electron conductivity of the electrode active material. In a case in which the electrode material is used as an electrode material used in lithium ion batteries, since it is possible to decrease the internal resistance and to improve the input and output characteristics, it is possible to further improve the discharge characteristics of lithium ion batteries, the electrode material can be applied to next-generation secondary batteries that are expected to procure a decrease in size and weight and an increase in capacitance, and, in the case of next-generation secondary batteries, the effects are extremely strong.

What is claimed is:

1. An electrode material comprising:
   an agglomerate formed by agglomerating a plurality of agglomerated particles formed by agglomerating a plurality of particles of a carbonaceous coated electrode active material having a carbonaceous coat formed on a surface,
   wherein the agglomerate is made up of hollow-structured particles containing voids and solid-structured particles,
   an average particle diameter of the agglomerate is in a range of 0.5 μm to 100 μm,
   a volume density of the agglomerate is in a range of 50% by volume to 80% by volume of a theoretical density of the electrode active material,
   a micropore distribution of micropores present in the agglomerate is monomodal, an average micropore diameter in the micropore distribution is 0.3 μm or less, and
   an N-methyl-2-pyrollidone oil absorption amount of the agglomerate is in a range of 40 g/100 g to 100 g/100 g,
   a diameter of the voids in the hollow-structured particles is in a range of 3.5 μm to 5.5 μm, and
   a ratio of a number of the hollow-structured particles of the agglomerates to a number of both of the hollow-structured particles and the solid-structured particles of the agglomerates is in the range of 15/50 to 24/50.

2. The electrode material according to claim 1, wherein a ratio of a film thickness of a carbonaceous coat in an inner circumferential portion to the film thickness of the carbonaceous coat in an outer circumferential portion of an outer shell of the agglomerate is in a range of 0.7 to 2.0.

3. An electrode comprising:
   electrode material according to claim 1.

4. A lithium ion battery comprising:
   a positive electrode made of the electrode according to claim 3.

5. The electrode material according to claim 1, wherein the plurality of particles of the carbonaceous coated electrode active material are strongly bonded together through the carbonaceous coats forming a neck-like shape with a small cross-sectional area, and
   channel-like or net-like micropores spread three-dimensionally inside an outer shell of the agglomerate, and
   the voids formed in the agglomerate and an outer space of the agglomerate are coupled through the channel-like or net-like micropores.

6. The electrode material according to claim 1, wherein the electrode active material comprises one element selected from a group of $Li_xA_yD_zPO_4$ as a principal component, wherein A represents one or more selected from a group consisting of Co, Mn, Ni, Fe, Cu and Cr; D represents one or two or more selected from a group consisting of Mg, Ca, S, Sr, Ba, Ti, Zn, B, Al, Ga, In, Si, Ge, Sc, Y and rare earth elements; and $0<x<2$, $0<y<1.5$, and $0<z<1.5$.

7. The electrode material according to claim 1, wherein 80% or more of the surfaces of the particles of a carbonaceous coated electrode active material are coated with the carbonaceous coat.

8. The electrode material according to claim 1, wherein a micropore diameter (D90) at which a cumulative volume percentage from a small micropore diameter side becomes 90% is 1.0 μm or less.

9. The electrode material according to claim 1, wherein a micropore diameter (D50) at which a cumulative volume percentage from a small micropore diameter side becomes 50%, is preferably 0.3 μm or less.

10. The electrode material according to claim 1, an internal resistance of the electrode material is 20Ω or less.

11. The electrode material according to claim 1, wherein an average particle diameter of primary particles size of the electrode active material is in a range of 0.01 μm to 20 μm.

12. The electrode material according to claim 1, wherein the electrode active material comprises at least one kind of particles selected from the group consisting of spherical particles, rectangular particles and rod-like particles.

13. The electrode material according to claim 1, wherein the electrode materials is obtained by a manufacturing method which comprises steps of
   producing a slurry by mixing an electrode active material or a precursor thereof, an organic compound and a solvent,
   spraying and drying the slurry to obtain a dried substance, and
   firing the dried substance at a temperature in a range of 500° C. to 1000° C. in a non-oxidizing atmosphere.

14. The electrode material according to claim 13, wherein the organic compound comprise any one or more compound selected from the group consisting of polyvinyl alcohol, polyvinyl pyrrolidone, polyvinyl acetate, cellulose, carboxymethyl cellulose, methyl cellulose, hydroxymethyl cellulose and hydroxylethyl cellulose, glucose, fructose, galactose, mannose, maltose, sucrose and lactose, starch, gelatin, polyacrylic acid, polystyrene sulfonate, polyacrylamide, glycogen, pectin, alginic acid, glucomannan, chitin, hyaluronic acid, chondroitin, agarose, polyethers and ethylene glycol, and glycerin.

15. The electrode material according to claim 13, wherein a mixing ratio of the organic compound to the electrode active material is in a range of 0.6 parts by mass to 10 parts by mass.

* * * * *